Oct. 25, 1938.　　　　E. CHRISTIANSEN　　　　2,134,225
VARIABLE SPEED FRICTION GEAR
Filed May 1, 1935　　　2 Sheets-Sheet 2
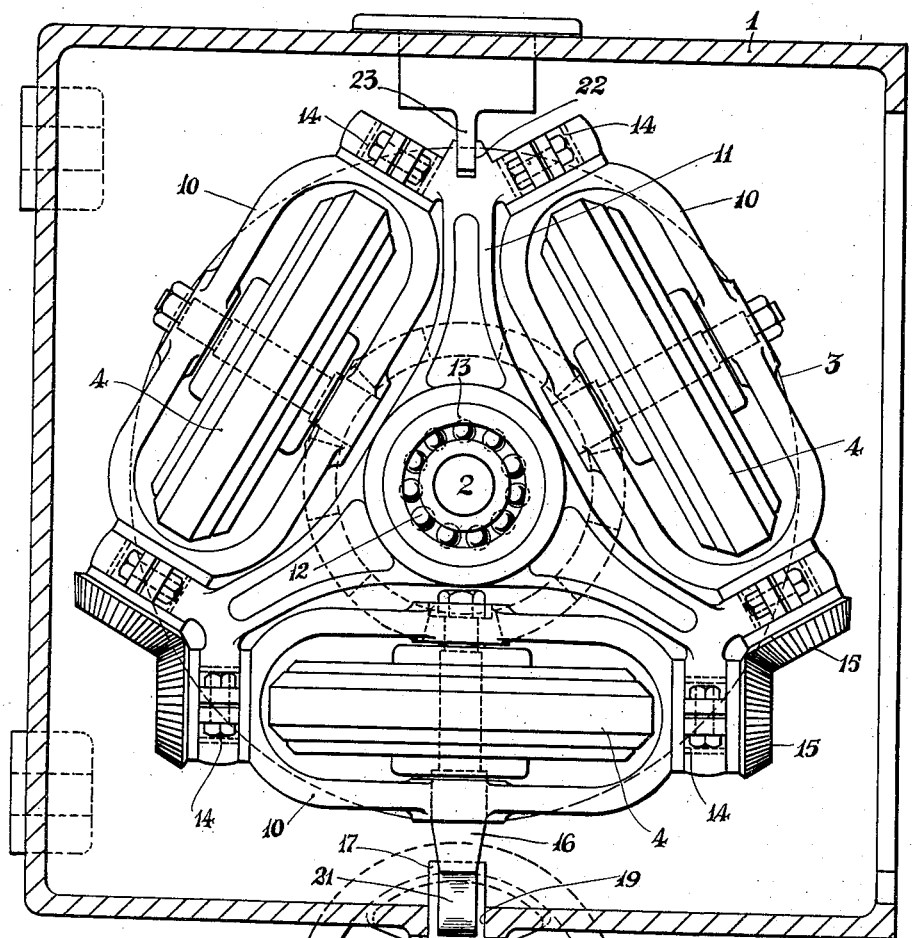
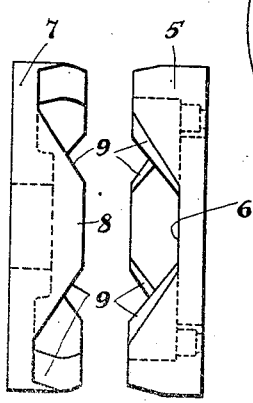
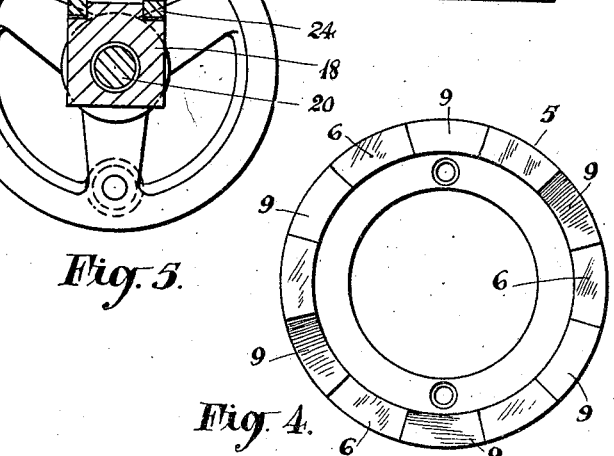
Fig. 2.　Fig. 3.　　Fig. 5.　　Fig. 4.
Ejnar Christiansen Inv.
by C. A. Snow & Co.
attys.

Patented Oct. 25, 1938

2,134,225

UNITED STATES PATENT OFFICE 2,134,225

VARIABLE SPEED FRICTION GEAR

Ejnar Christiansen, Birmingham, England

Application May 1, 1935, Serial No. 19,290
In Great Britain March 13, 1935

1 Claim. (Cl. 74—200)

This invention comprises certain improvements in or relating to variable speed friction gears of the type comprising face friction discs which are pressed against tiltable intermediate friction rollers, in accordance with the power transmitted, the friction rollers being carried in a frame, and it has for its object improved means for mounting the frame carrying the intermediate friction rollers.

Referring to the drawings:—

Figure 2 is a side elevation of a cam member hereinafter referred to.

Figure 3 is a side elevation of a cam member which coacts with that shown in Figure 2.

Figure 4 is an inside face view of the cam member shown by Figure 3, and

Figure 5 is a section through the gear box casing on line 5—5 of Figure 1, but showing the gear in side elevation with one face friction disc removed.

Figure 1:
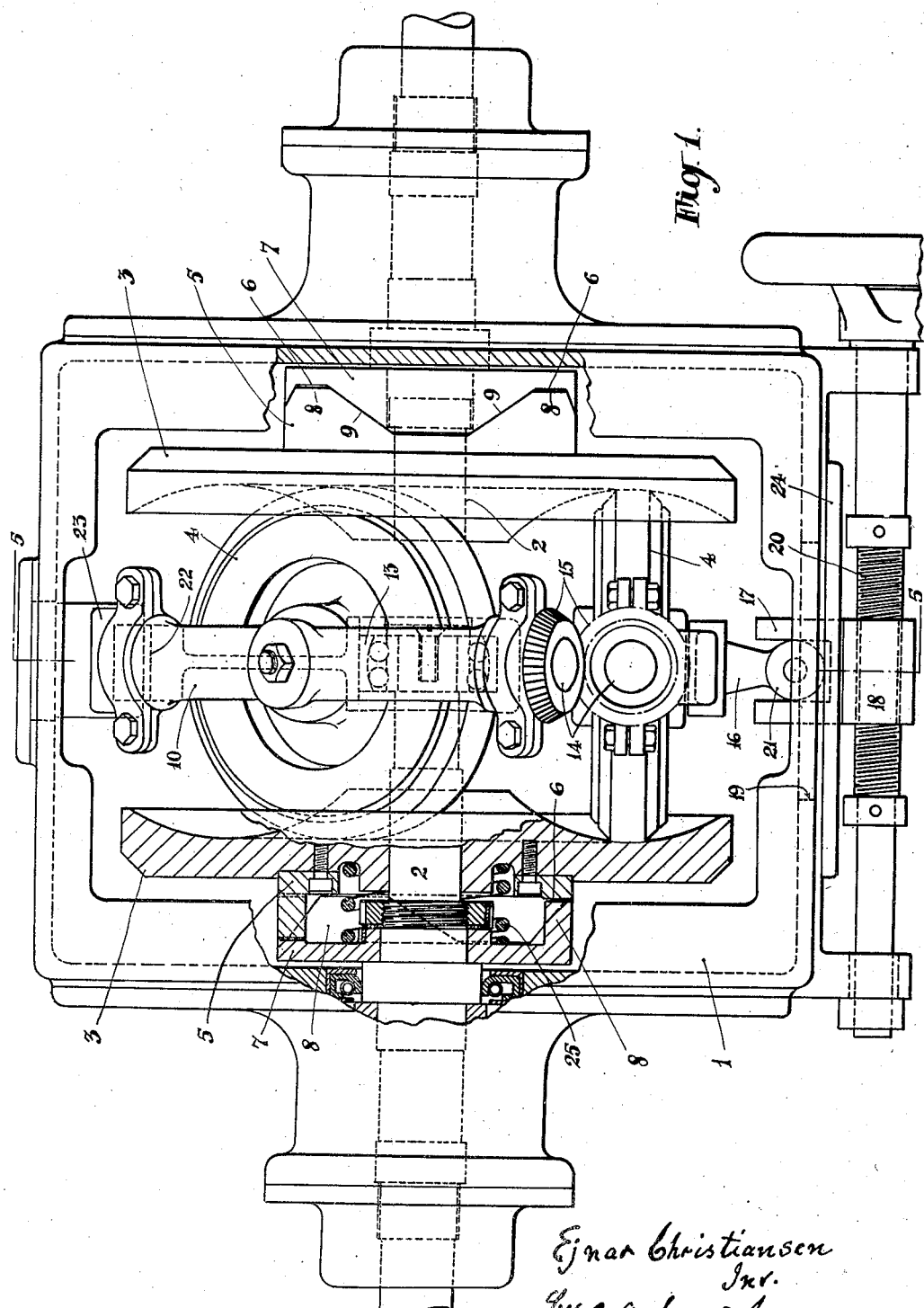
Figure 1 is a plan view of a variable speed friction gear constructed according to this invention, a part of one face friction disc and associated cam members being shown in cross section.

According to one form of the invention, the device comprises a box 1, in bearings on the opposite walls of which are mounted two spindles 2 slidably carrying on their inner ends face friction discs 3 which are pressed inwardly against the intermediate tiltable friction roller or rollers 4. The back face of each friction disc has fixed thereto or formed thereon a ring or member 5 having a plurality of, conveniently three, recesses 6. Each shaft carrying the face friction discs carries or has formed thereon a collar 7 having corresponding shaped projections 8. The said three recesses and projections are formed by equally and oppositely inclined or reversely arranged helical faces 9. The coacting cam members 7 are of the same shape and each comprise three recesses and projections. Anti-friction rollers may be arranged between the cam members. When, therefore, the driven shaft is rotated in either direction, the inclined faces of the cam member thereon will coact with the inclined faces of the cam member on the face disc and will thus force the face disc axially against the intermediate rollers. The pressure will thus depend on the power transmitted and will vary in accordance therewith. The amount of pressure will be governed by the angle of the cam face 9 and this angle can be varied to give any desired pressure required. The driven shaft and face disc mounted thereon are similarly provided with cam members 5 and 7 and therefore the driven face disc will also be pressed against the intermediate friction roller or rollers in accordance with the power transmitted. When the intermediate rollers 4 are tilted so that the face friction discs 3 contact with the intermediate rollers at different distances from the centres, the torque is correspondingly different, and if the rollers are carried in cradles pivoted in a fixed housing, the end pressure of the disc 3 on the rollers 4 will be greater than the end pressure of the other disc 3 and the gear box would be impracticable. A feature of this invention is present in that the intermediate rollers are free to float in a direction axially of the driving and driven shafts. The intermediate rollers 4 are mounted in cradles 10 which are tiltable in the frame 11, which is mounted on the ball bearing 12 on one shaft 2. The frame 11 is free to slide axially on the outer race ring 13, so that it is free to float axially between the face friction discs. The trunnions 14 of the cradles 10 are geared together by bevel wheels 15, in order that the intermediate rollers will be tilted simultaneously, and an arm 16 on one cradle engages between the arms 17 of the forked slide 18 guided in a slot 19 in the wall of the box. The slide is mounted on the screwed spindle 20 mounted on the outside of the box, and when the spindle is rotated the slide is adjusted to move the arm 16 to change the gear ratio. The end 21 of the arm is rounded to enable it to swivel between the arms 17 of the slide. The housing 20 is prevented from rotating by its engagement with the slide and also by the slot 22 in the opposite end of the carrier engaging the projection 23 on the wall of the box. The slot 19 in the wall of the box forming a slideway for the slide 18 is closed by the plate 24 carried by the slide. The engagement of the arm 16 with the slide 18 leaves the housing 10 free to float to equalize the end pressure on the intermediate rollers, but as the movement is extremely small any turning effect caused by the arm remaining in engagement with the slide 18 is extremely small and will not affect the speed ratio. The inner bearing surface of the outer race ring 13 is spherical and the bearing balls are arranged so that the housing 10 is free to swivel laterally in order that all the intermediate rollers will be free to adjust themselves to bear equally on both the face friction discs. The face friction discs are pressed against the intermediate friction rollers by means of helical springs 25 and these helical springs are conveniently mounted on the respective shafts and inside the cam members. The face friction discs are therefore always maintained in driving contact with the intermediate rollers and therefore the friction members are always in position to commence the drive.

With the aforedescribed construction, the drive can be transmitted through the box from either side whilst furthermore the drive can be transmitted through either spindle either forward or reverse.

I claim:

A variable speed friction gear of the type set forth comprising a frame for the intermediate tiltable friction rollers, an inner race ring of a roller carrier fixed to a shaft carrying a face friction disc, an outer race ring of the roller carrier on which the said frame is slidably mounted to be capable of an axial movement thereon and which outer race ring has an inner spherical bearing surface mounted on balls so that in addition to a rotating movement it is capable of a spherical rocking movement, in order that the frame in any adjusted axial position can tilt to adjust all the intermediate rollers into adhesive contact with the face friction discs.

EJNAR CHRISTIANSEN.